(12) United States Patent
Sadegh et al.

(10) Patent No.: US 12,312,254 B2
(45) Date of Patent: May 27, 2025

(54) DESALINATION SYSTEM

(71) Applicants: Research Foundation of the City University of New York, New York, NY (US); Sun Fresh Water, LLC, Ormond Beach, FL (US)

(72) Inventors: Ali M. Sadegh, Franklin Lakes, NJ (US); Jorge E. Gonzalez-Cruz, Baldwin, NY (US); Joseph James D'Alba, Ormond Beach, FL (US); George Victor St. Pierre, Ormond Beach, FL (US); George Farinick, Ormond Beach, FL (US)

(73) Assignees: Research Foundation of the City University of New York, New York, NY (US); Sun Fresh Water, LLC, Ormond Beach, FL (US)

( * ) Notice: Subject to any disclaimer, the term of this patent is extended or adjusted under 35 U.S.C. 154(b) by 141 days.

(21) Appl. No.: 17/878,581

(22) Filed: Aug. 1, 2022

(65) Prior Publication Data

US 2022/0363566 A1 Nov. 17, 2022

Related U.S. Application Data

(63) Continuation-in-part of application No. 17/440,951, filed as application No. PCT/US2020/023257 on Mar. 18, 2020, now Pat. No. 11,401,174.

(60) Provisional application No. 62/893,402, filed on Aug. 29, 2019, provisional application No. 62/819,899, filed on Mar. 18, 2019.

(51) Int. Cl.
*C02F 1/14* (2023.01)
*C02F 1/04* (2023.01)
*C02F 103/08* (2006.01)

(52) U.S. Cl.
CPC ............... *C02F 1/14* (2013.01); *C02F 1/043* (2013.01); *C02F 1/048* (2013.01); *C02F 2103/08* (2013.01)

(58) Field of Classification Search
CPC .................................................. C02F 1/04–18
USPC ...................................... 137/40, 41, 42, 263
See application file for complete search history.

(56) References Cited

U.S. PATENT DOCUMENTS

| 2,902,028 | A | | 9/1959 | Manly |
| 3,384,558 | A | * | 5/1968 | Olson ....................... C02F 1/14 |
| | | | | 159/903 |
| 3,815,574 | A | | 6/1974 | Gaydos, Jr. |
| 4,078,976 | A | | 3/1978 | Spears, Jr. |
| 4,267,021 | A | | 5/1981 | Speros et al. |
| 4,318,781 | A | | 3/1982 | Iida |

(Continued)

FOREIGN PATENT DOCUMENTS

JP 3003844 U * 11/1993 ........... Y02A 20/212

OTHER PUBLICATIONS

ISA/US; International Search Report/Written Opinion for corresponding International Application PCT/US2020/023257 Issued Jun. 26, 2020.

*Primary Examiner* — Jonathan Luke Pilcher
(74) *Attorney, Agent, or Firm* — Peter J. Mikesell; Schmeiser, Olsen & Watts, LLP

(57) ABSTRACT

A heating system for use in the solar powered heating of water. In one embodiment, the heating system is used in conjunction with a solar water farm to desalinate water. The water farm can be utilized on a variety of scales and can be applied to agricultural farms for large scale reclamation of deserts.

12 Claims, 16 Drawing Sheets

(56) References Cited

U.S. PATENT DOCUMENTS

| | | | |
|---|---|---|---|
| 5,067,272 A | 11/1991 | Constantz | |
| 5,628,879 A | 5/1997 | Woodruff | |
| 5,645,693 A * | 7/1997 | Gode | B01D 1/26 |
| | | | 203/DIG. 1 |
| 5,650,050 A | 7/1997 | Kaufmann | |
| 5,672,250 A | 9/1997 | Ambadar et al. | |
| 6,274,004 B1 | 8/2001 | Andersen | |
| 6,391,162 B1 | 5/2002 | Kamiya et al. | |
| 6,761,802 B2 | 7/2004 | Azimi | |
| 6,797,124 B2 | 9/2004 | Ludwig | |
| 8,246,787 B2 | 8/2012 | Cap et al. | |
| 8,353,286 B2 | 1/2013 | Li | |
| 10,150,049 B2 | 12/2018 | D'Alba et al. | |
| 10,150,050 B2 | 12/2018 | Sadegh et al. | |
| 11,156,384 B2 | 10/2021 | Qu et al. | |
| 11,160,223 B2 | 11/2021 | Friesen et al. | |
| 2003/0038022 A1* | 2/2003 | Rogde | C02F 1/14 |
| | | | 202/205 |
| 2003/0150704 A1 | 8/2003 | Posada | |
| 2007/0245730 A1 | 10/2007 | Mok | |
| 2008/0078670 A1 | 4/2008 | Al-Garni et al. | |
| 2014/0124356 A1* | 5/2014 | Mueller | C02F 1/14 |
| | | | 126/714 |
| 2014/0231327 A1 | 8/2014 | D'Alba et al. | |
| 2016/0166946 A1 | 6/2016 | D'Alba et al. | |
| 2017/0291118 A1 | 10/2017 | Sadegh et al. | |
| 2018/0362365 A1* | 12/2018 | Ackerman | C02F 1/048 |
| 2019/0225506 A1* | 7/2019 | Peng | C02F 1/047 |

\* cited by examiner

DESALINATION SYSTEM

CROSS-REFERENCE TO RELATED APPLIGATIONS

This application claims priority to and is a continuation-in-part of U.S. patent application Ser. No. 17/440,951 (filed Sep. 20, 2021) which is a national stage entry of international Patent Application PCT/US2020/023257 (filed Mar. 18, 2020) which claims priority to U.S. Patent Applications 62/819,899 (filed Mar. 18, 2019) and 62/893,402 (filed Aug. 29, 2019) the entirety of which are incorporated herein by reference.

BACKGROUND OF THE INVENTION

The subject matter disclosed herein relates to solar powered desalination devices. Governments in developing countries are challenged to provide sufficient amounts of potable drinking water to their population. In such countries water is often contaminated with salt or microorganisms which presents a health concern. While previous attempts have been made to provide potable water, none of these attempts have proven entirely satisfactory. These attempts often suffer from a lack of sufficient throughput or are too costly. Accordingly, alterative water purification devices are desired.

The discussion above is merely provided for general background information and is not intended to be used as an aid in determining the scope of the claimed subject matter.

SUMMARY

A heating system for use in the solar powered heating of water is disclosed. In one embodiment, the heating system is used in conjunction with a solar water farm to desalinate water. The water farm can be utilized on a variety of scales and can be applied to agricultural farms for large scale reclamation of deserts.

In a first embodiment, a water farm is provided. The water firm comprising: a water storage tower; at least one pump, powered by a green power source, that pumps water from a water reservoir to the water storage tower; a plurality of vertically stacked pipes for releasing water from the water storage tower and conveying the water to a day tank; a plurality of desalination units fluidly connected to the day tank, the plurality of desalination units providing desalinated water to a common output pipe; and a potable water storage tank fluidly connected to the common output pipe for receiving the desalinated water therefrom.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which.

DETAILED DESCRIPTION OF THE INVENTION

This disclosure provides a desalinating unit for desalinating water. The desalinating unit provides for a means of converting desert land to agricultural land. For example, the Sahara Desert is on the African continent near the Mediterranean Sea. These parameters form the configuration of this system of converting the Sahara Desert to agricultural lands. The disclosed system creates a synergy of portable water production for agriculture, animal domestication, and human consumption. Simultaneously, it mitigates climate change and rising oceans all while reducing competition for water and. thereby reducing human tensions.

Figure 1:
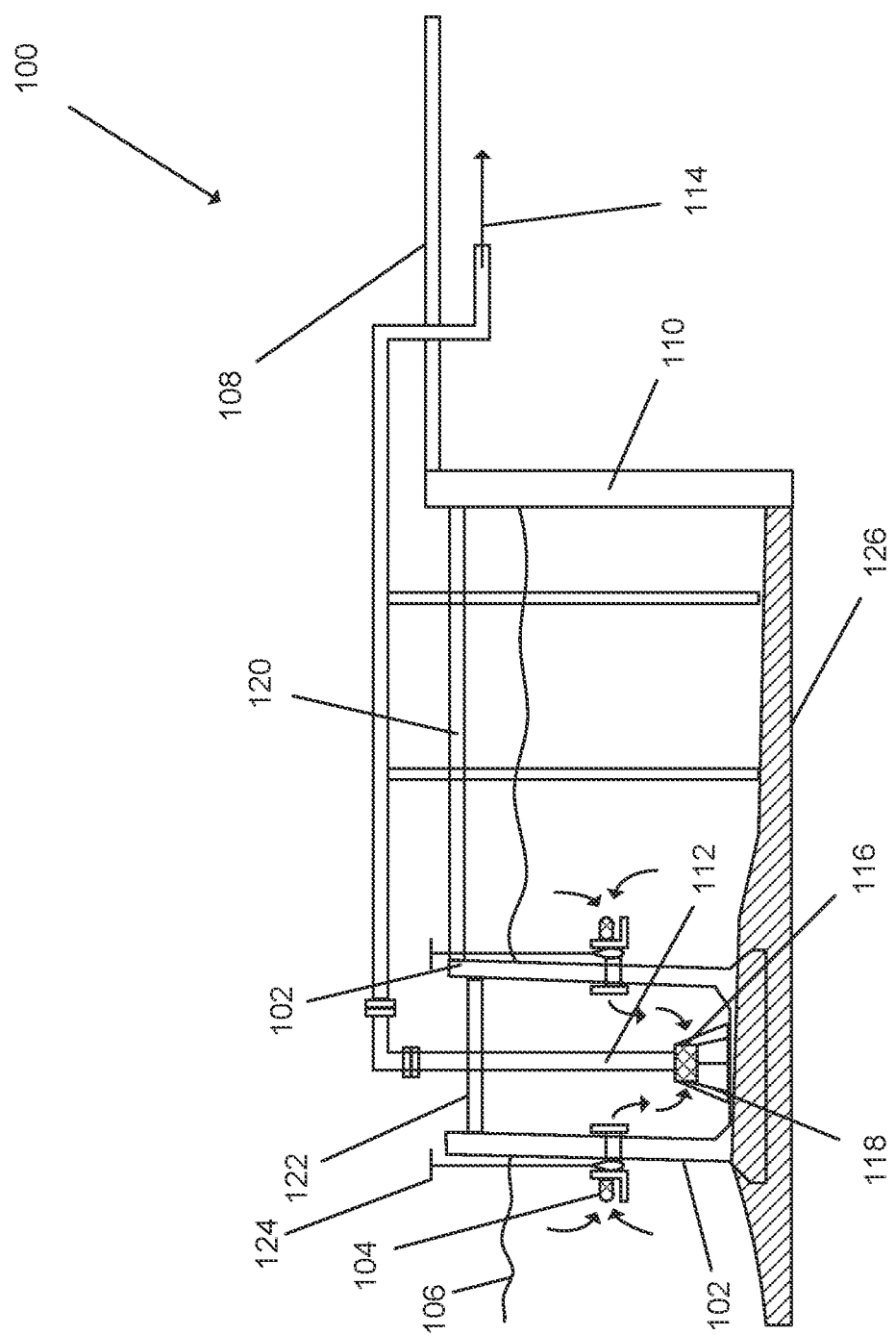
FIG. 1 is a schematic depiction of a water-intake system for removing water from a body of water.

Referring to FIG. 1, a water-intake system 100 is depicted. A sea water vault 102 is partially submerged below water 106 near a coast 108. A natural or artificial levee 110 may be present. A sea water vault 102 includes at least one mesh 104 for removing solid particulates from the sea water. An intake pipe 112 has an open end within the vault 102 that moves water out of the vault 102 and toward the coast 108 in the direction of arrow 114. The opening of the intake pipe 112 may be equipped with a mesh 116. The intake pipe 112 may be formed of a corrosion-resistant material such as stainless steel. The portion of the intake pipe 112 that is exposed above the surface of the water may be anodized or painted black such that the intake pipe 112 preheats due to sunlight. Such a configuration heats the water within the intake pipe 112. Common embodiments use an intake pipe 112 that is at least 1.6 km long as measured in the horizontal direction. This gives the water to relatively high residence time within the intake pipe 112 which, in turn, heats the water substantially.

In another embodiment, water 106 is wastewater from an oil or natural gas extraction facility or a fracking facility. During such extractions, large volumes of wastewater are produced. Traditionally, this wastewater is merely injected into the ground such that it is inaccessible. The disclosed water-intake system 100 provides an alternate method for managing such wastewater.

The water vault 102 may be, for example, a rectangular or cylindrical structure that is securely held in place by being partially buried in gravel 126. The mesh 116 and opening of the intake pipe 112 may be securely mounted to the interior of the sea water vault 102 with mounting stool 118. A grate walkway 120 connects the coast 108 with the top of the vault 102 such that a person can access the top of the vault 102. A grate 122 covers the top opening of the vault 102 such that excess water can enter and exit the vault 102. Each mesh 104 can be selectively closed by operating a valve control 124 that is accessible from the top of the vault 102. Water is removed in the direction of arrow 114 by virtue of pumps 200, 202 (see FIG. 2).

Figure 2:
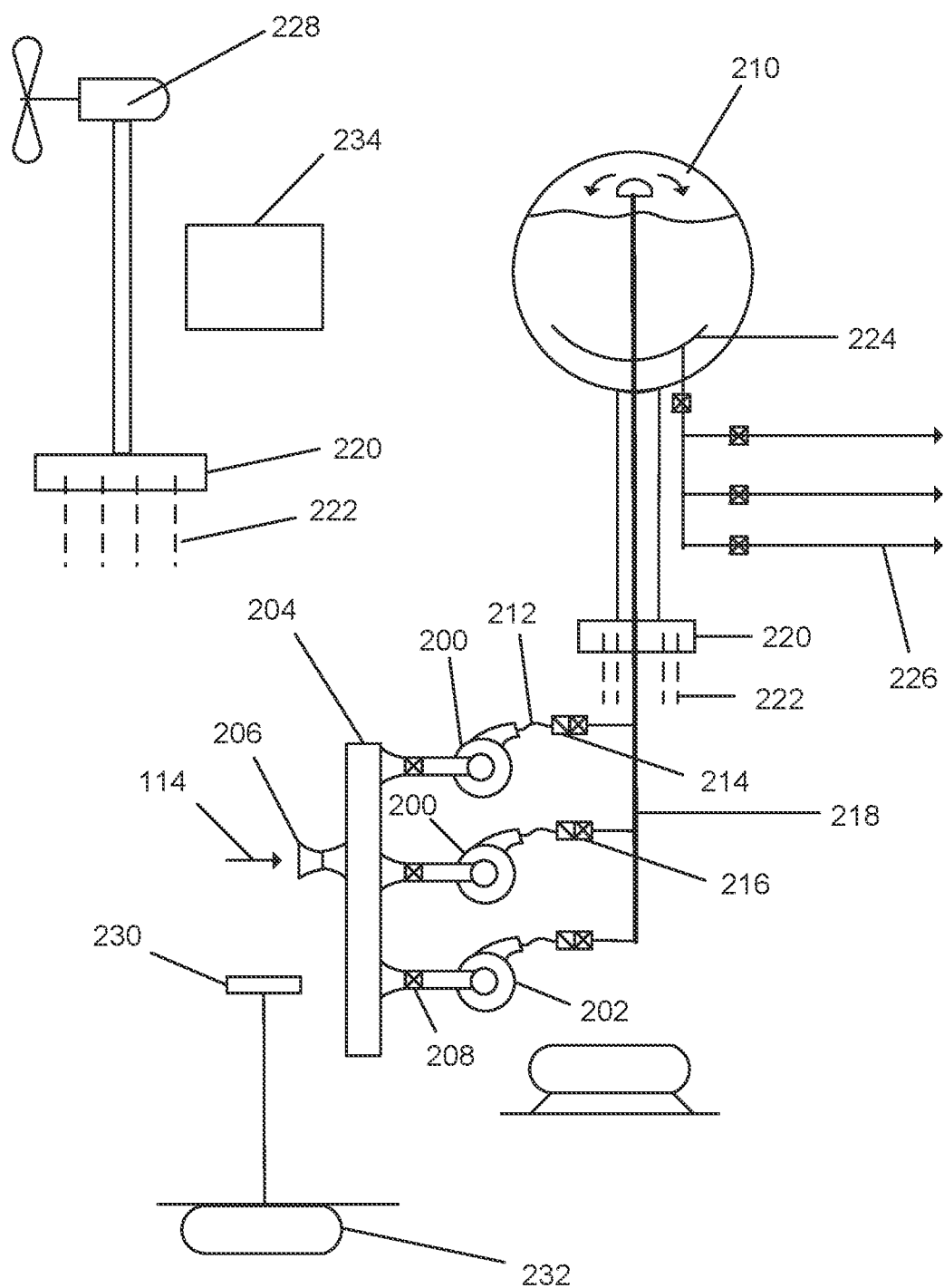
FIG. 2 is a schematic depiction of a system for transporting water from the water-intake system to a saltwater storage tower.

FIG. 2 depicts a manifold 204 that includes a knockout drum 206 that connects to the intake pipe 114 (see FIG. 1). An overflow drain 230 connects to an overflow tank 232 to collect any water that might be lost when lines are connected to disconnected from the knockout drum 206. The manifold 204 connects to a plurality of pumps 200 that may be powered by a green power source 228 (e.g. wind power source, a solar power source or a wave-powered source, or a photovoltaic panel 234). A wave-powered pump uses vertical wave action to lift a float that turns a gear. That gear turns at least one additional gear that drives an Archemedies Screw. This action, in turn, pumps the water to a saltwater storage tower 210. Once the wave apexes the vertical drive to the gear is released and drops down to the nadir of the wave. As the wave rises again, the process repeats and the Archemedies Screw is turned further, ultimately lifting the sea water to the saltwater storage tower 210. In one embodiment, at least one diesel pump 202 is present as a backup pump. Each pump 200, 202 can be selectively disconnected from the manifold 204 by operation of respective valves 208.

Downstream from each of the pumps 200, 202 is a, flex joint 212, a check valve 214 and a gate valve 216. These each convey saltwater to a common pressured pipe 218 and conveys water to the seawater storage tower 210 that holds the seawater at an elevation of at least six meters. The saltwater storage tower 210 is securely mounted to the ground with seismic pad 220 that is further mounted to the ground with piles 222. In one embodiment, the saltwater storage tower 210 has a sparger 224 or other filters.

Saltwater storage tower 210 is formed from a corrosion-resistant material such as stainless steel. Like intake pipe 112, the storage tower 210 may be painted or anodized black to heat the water within the storage tower 210. In many desert-like environments, water within the storage tower 210 can be heated to temperatures of about 90° C. by the sun. Water level sensors (e.g. float sensors) are present which selectively actuate pumps 200, 202 to maintain a constant volume of water within the saltwater storage tower 210. The saltwater storage tower 210 is elevated above pipes 226 such that water can be fed to pipes 226 by gravity. In one embodiment, the pipes 226 are above-ground pipes that are exposed to sunlight. Three pipes are shown in FIG. 2 which are vertically stack above one another to facilitate removal of water using gravity. The lowest pipe has the greatest pressure due to the relatively high volume of water. This permits the lowest pipe to send water to a relatively distant location. The middle pipe has less volume of water and therefore supplies water at a lower pressure. This renders the middle pipe useful for transporting water an intermediate distance away. The highest pipe has the least volume of water which makes the highest pipe useful for sending water to relatively nearby locations. The pipes 226 may be formed of stainless steel and may be painted or anodized black to pre-heat the water within the pipes 226.

Figure 3:
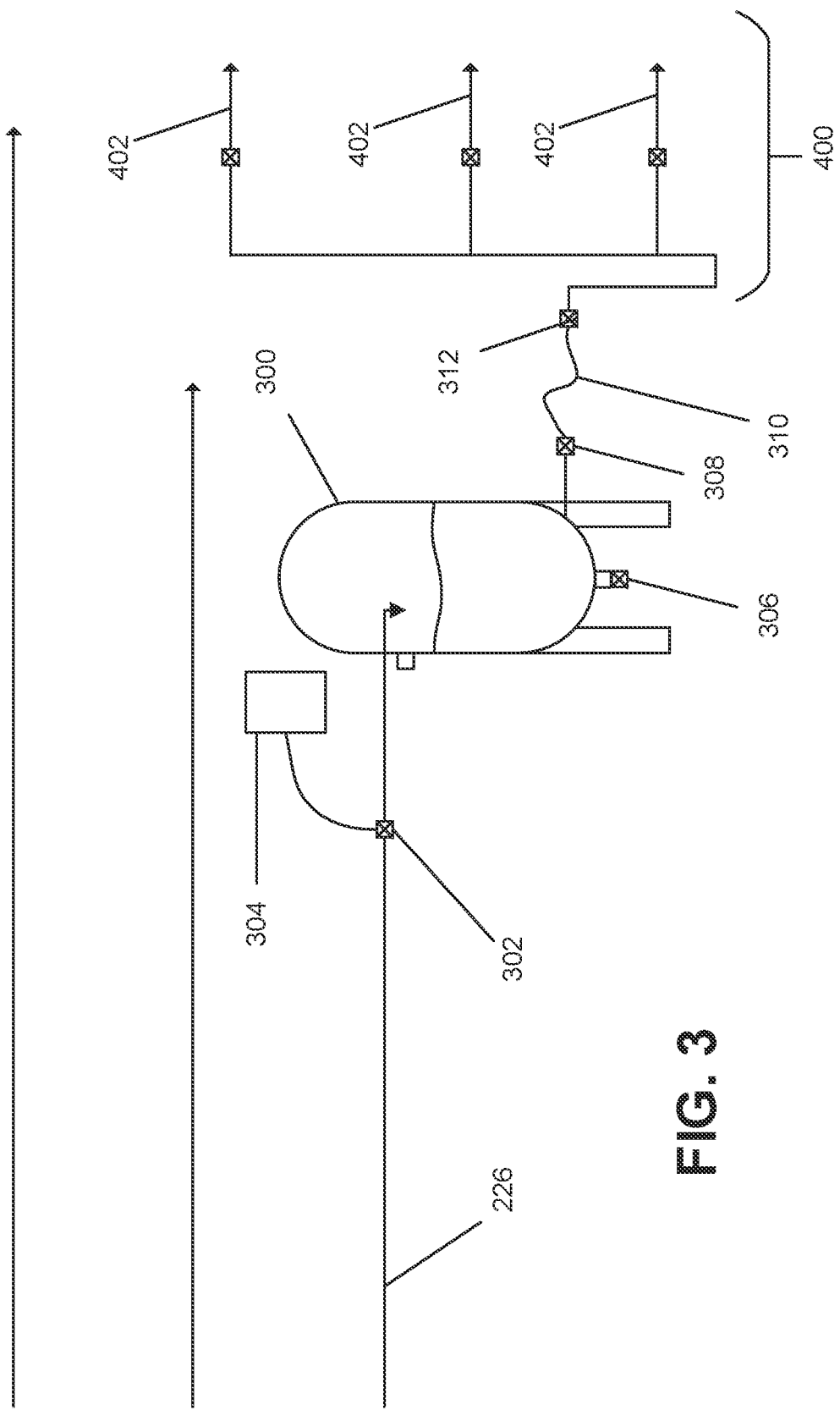
FIG. 3 is a schematic depiction of a system for transporting water from the saltwater storage tower to a day tank.

FIG. 3 shows the saltwater pipes 226 that send salt water to a day tank 300. In the embodiment of FIG. 3. only the lowest pipes 226 is utilized for illustration purposes. The highest pipe and the middle pipe may also be used to send water to the same or different locations. A valve 302 (powered by a green power source 304) selectively actuates to add salt water to day tank 300 when a sensor indicates the water level is low in day tank 300. By only adding water when the water level is low, water residence time within pipes 226 is maximized. This promotes pre-heating of the water. The day tank 300 includes a bottom valve 306 that is useful for cleaning the day tank 300. An output valve 308 leads to a flex line 310 which, in turn, connects to an array 400 of desalination units via valve 312.

Figure 4:
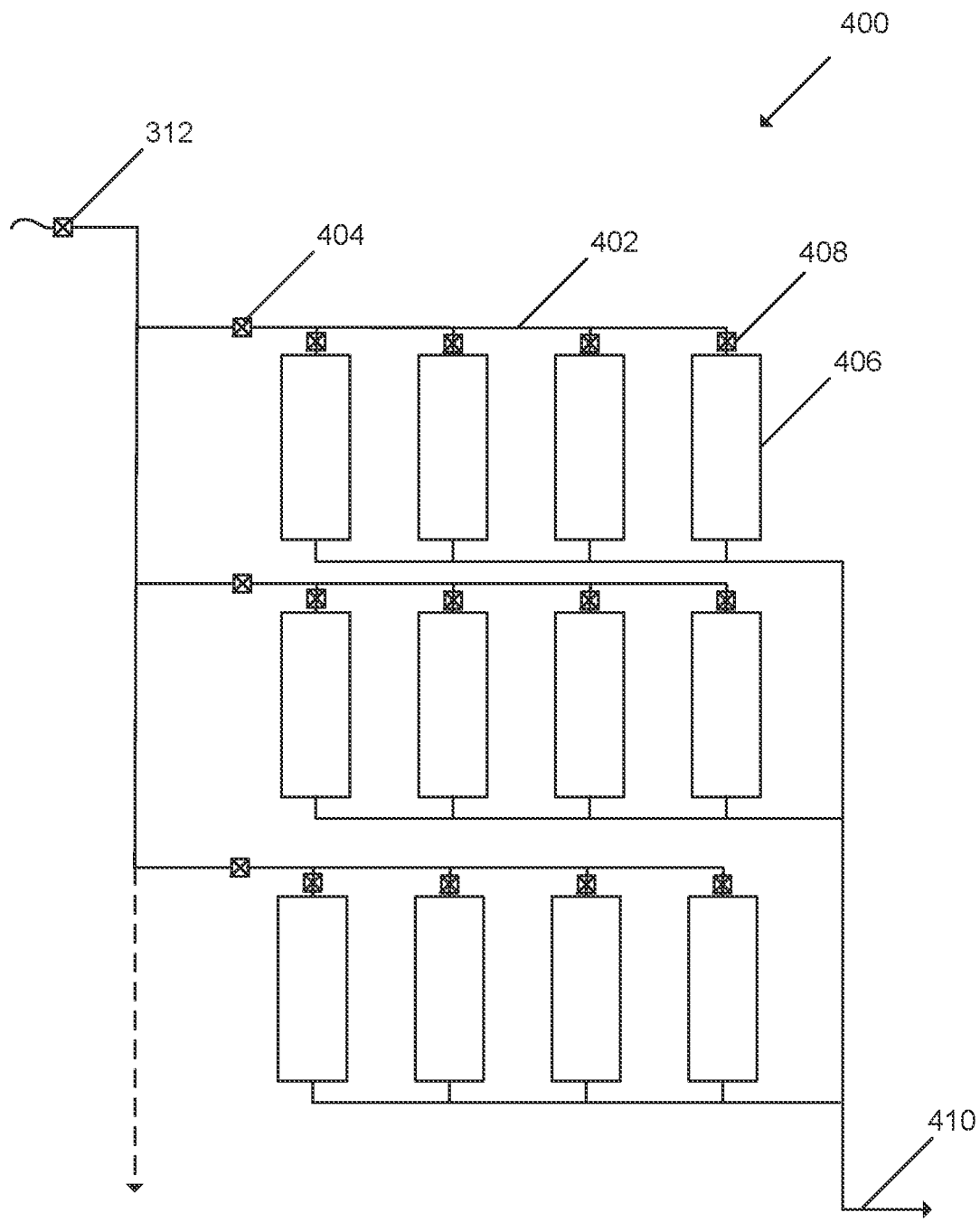
FIG. 4 is a schematic depiction of an array 400 of desalination units that purifies water from a day tank and provides potable water to potable water storage tank.

FIG. 4 depicts the array 400 of desalination units 406. The array 400 comprises a plurality of lines 402 each of which has a corresponding plurality of desalination units 406. Seawater can be selectively fed to each line 402 by actuating a respective valve 404. In some embodiments, a pre-heating system is connected to line 402 just upstream of valve 404. Suitable pre-heating systems are described elsewhere in this specification. Additionally, each specific desalination unit 406 within each line 402 can be further actuated with a corresponding valve 408. The desalination units 406 may be solar desalination units described in, for example, U.S. Pat. Nos. 10,150,049 and 10,150,050, the content of which are hereby incorporated by reference.

In FIG. 4 the array 400 is shown having three lines 402, each having four desalination units. It should be appreciated that this configuration is scalable such that fewer or additional desalination units and/or lines can be used. At least one array is present, and each array may have any number of lines and/or desalination units. The multiple desalination units provide a high voluble of potable water. The resulting potable water is then sent through output pipe 410. Each of the desalination units shown in FIG. 4 feed to a common output pipe 410 that transports potable water to a potable water storage tank 500 (see FIG. 5). In other embodiments, there are multiple output pipe 410, each of which is attached to a plurality of desalination units 406.

Figure 5:
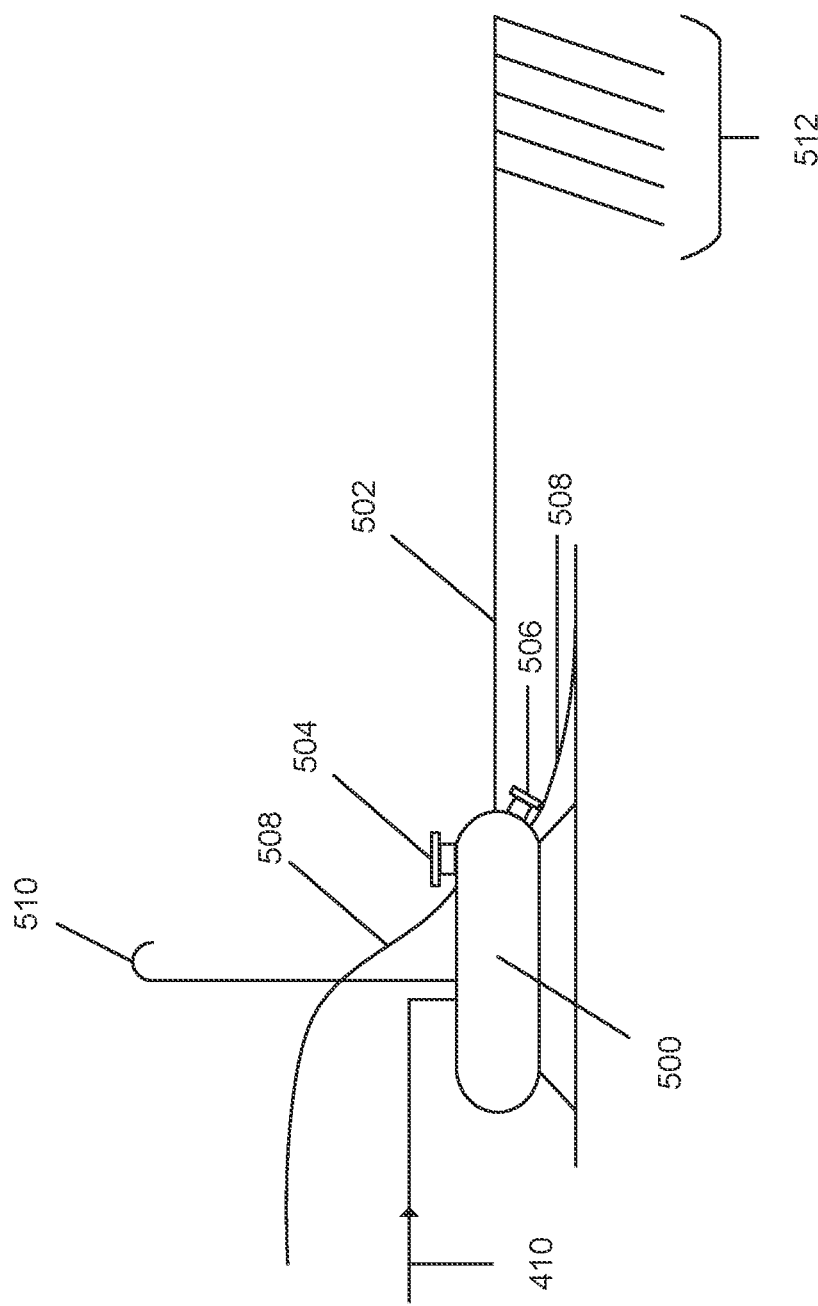
FIG. 5 is a schematic depiction of the potable water storage tank that provides potable water to a farm area.

FIG. 5 shows the potable water storage tank 500 that receives the potable water from the output pipe 410. The potable water storage tank 500 has an access port 502 through which water can be removed, a top manway 504 and a clean out manway 506 that permits access to the interior for cleaning. Duration installation, the potable water storage tank 500 may partially buried below ground 508 and be inclined such that a back-pitch is provided. This causes any sediment to accumulate at the back of the tank where it is kept at a distance from the access port 502. The potable water storage tank 500 may be partially buried such that only the access port 502 and manways 504, 506 are accessible with the remainder of the tank 500 being buried. This is both appealing for cosmetic reasons and prevents excessive heating of the potable water in the desert environment. A vent 510 is present that permits air to enter as water is removed. In one embodiment, the vent 510 is a filtered vent. FIG. 5 shows the potable water being sent from the potable water storage tank 500 to a farm area 512 to irrigate the area. The water could also be utilized for other purposes including greenhouses, hydroponics, human consumption, livestock, etc. For example, the potable water may be used in nearby green houses that contain systems of hydroponic vegetable production, a nearby agriculture field or for consumption by humans or livestock. Outside of the green houses are carbon dioxide consuming plants.

Figure 6:
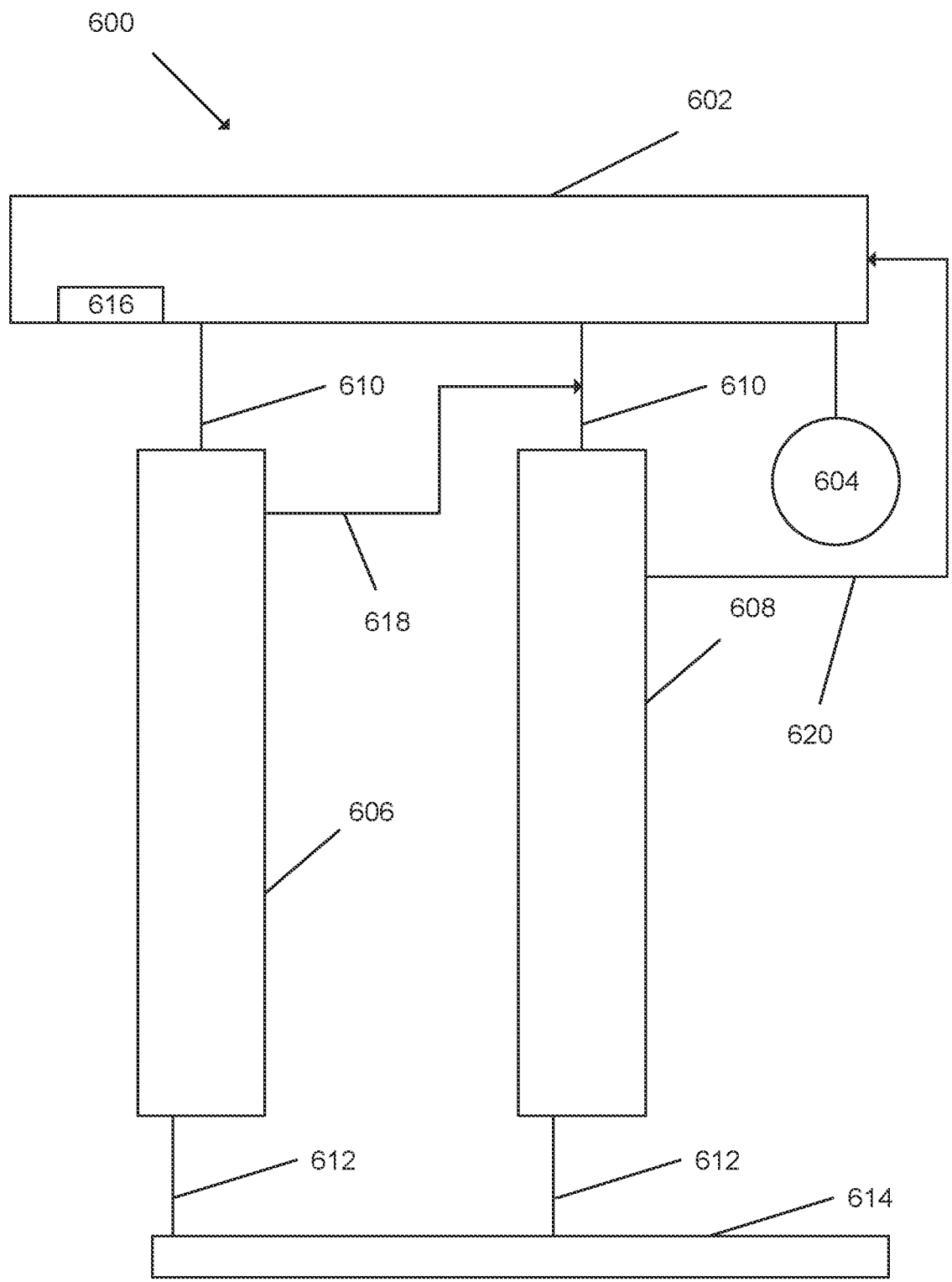
FIG. 6 depicts one embodiment of a desalination system.

Referring to FIG. 6 a desalination system 600 is shown. FIG. 6 provides a. top view of the desalination system 600. For this discussion, one desalination system 600 is discussed, however each is scalable and readily reproduced to create the potential to convert large areas of desert to agricultural production. The entire line 602 may be elevated such that the line 602 is elevated a set distance (e.g. ten meters) above the ground. The desalination system 600 may be elevated by, for example, a plurality of posts. Advantageously, this permits utilization of the area under the desalination system 600 for other purposes (;e.g. foot traffic, roads, etc.).

The desalination system 600 comprises two basic components. In the embodiment of FIG. 6, the line 602 is an external reservoir, which contains salt water.

This water is obtained from a nearby saltwater source, such as the Mediterranean Sea. Lines 602, for example, may be the lines 402 of FIG. 4. The saltwater is pumped into the line 602 by pumps 604, such as pumps 200, 202 of FIG. 2.

The line 602 functions to pre-heat the water before the water is introduced to the desalination units 606, 608. The relatively simple line 602 is inexpensive and simple to manufacture. By using elongated lines 602, the residence time of water within the line 602 can be controlled. This, in turn, allows substantial heating of the water before the water is introduced into the desalination units 606, 608. By using pre-heated water, the length of the more-expensive desalination units 606, 608 can be reduced. This, in turn, reduces the overall cost of the desalination system 600. In embodiments that have a pre-heating system, the desalination units can be opaque and do not need to be solar desalination units. Instead, the desalination units are primarily condensers. In one embodiment, the desalination units are opaque and color white to facilitate cooling of the desalination units.

Egress of saltwater from the line 602 is controlled by a heat sensor 616 that operates a valve controller that controls water flow through tubes 610. The valve controller can actuate each valve independently of the remaining valves. In some embodiments, water-level sensors are present in each of the desalination units 606, 608 that are also coupled to the valve controller. If the water level in any given desalination unit drops below a threshold value, the corresponding valve may be actuated to add water to the respective desalination unit. This can occur irrespective of the temperature of the pre-heated water in the line 602. Once the saltwater water reaches a set temperature (e.g. at least 60° C., at least 70° C., etc.) the heat sensor 616 cause the tubes 610 to be opened.

The tubes 610 are located a set distance (e.g. 15 cm, 30 cm, etc.) below the horizontal top of the line 102 so that the vast majority of the saltwater is vaporized and the efficiency of the unit is maximized. Each time the tubes 610 are opened a fixed amount of contaminated water is introduced to one of the desalination units 606, 608.

The line 602 feeds the desalination units 606, 608. Two desalination units are utilized so that one unit can be shut down and cleaned while the other remains in operation. The line 602 is connected to the desalination units 606, 608 (which, in the embodiment of FIG. 6 are perpendicular) via tubes 610 (e.g. 3" diameter tubes) that transfer heated water from the line 602 to the desalination units 606, 608.

The two desalination units 606, 608 may be, for example, nine meters in length with an interior diameter of one meter. Both the walls of the line 602 and the walls of the desalination units 606, 608 are evacuated thereby making each a thermos. The desalination units 606, 608 are similar to those described in U.S. Pat. Nos. 10,150,049 and 10,150,050, the content of which are hereby incorporated by reference. However, the trays into which the contaminated water is contained are inclined so that the contaminated water runs over the trays and exits into a contiguous production tube, again connected via tubes. For example, in one embodiment, the overflow channel 618 described in U.S. Pat. No. 10,150,049 sends water from desalination unit 606 to an adjacent desalination unit 608 through overflow channel 618 (e.g. overflow from desalination unit 606 is sent to desalination unit 608).

FIG. 6 depicts two desalination units, but any number of desalination units can be linked in series in this manner. For example, the excess saltwater flows into a. second production unit, then a third, fourth, fifth, etc. Once the remaining saltwater reaches the last production tube it egresses out of the system and is returned to the line 602 via green means (e.g. a photovoltaic pump) using overflow channel 620. Within the desalination units 606, 608, the water vapor condenses on the interior ceiling as portable water, runs down the walls and exit the desalination units 606, 608 to potable water storage tank 614 via output pipe 612. Potable water in potable water storage tank 614 may be used in a manner similar to the potable water in potable water storage tank 500 (see FIG. 5).

Figure 7:
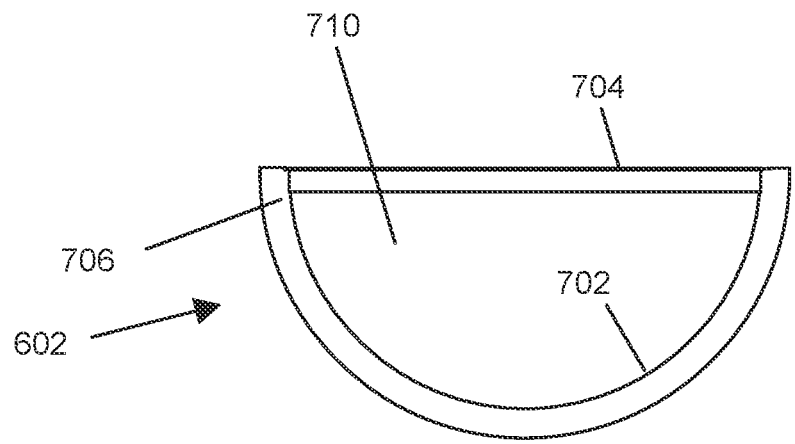
FIG. 7 shows a cross sectional end view of one embodiment of a transport line.

FIG. 7 is a cross sectional end view of one embodiment of the line 602. FIG. 7 depicts a bottom opaque surface 702 which may be colored black to promote heating of the water. In one embodiment, an optically transparent cover 704 is present. In one embodiment, the line 602 is nine meters in length with an interior diameter of three meters. The optically transparent cover 704 of the line 602 is the top. Line 602 has evacuated walls 706 around the circumference of the bottom opaque surface 702, the horizontal portion of its cover 704, and the caps on the ends. The optically transparent cover 704 may also be evacuated. Water passes through a hollow channel 710. Thus, the line 602 is a thermos.

Figure 8:
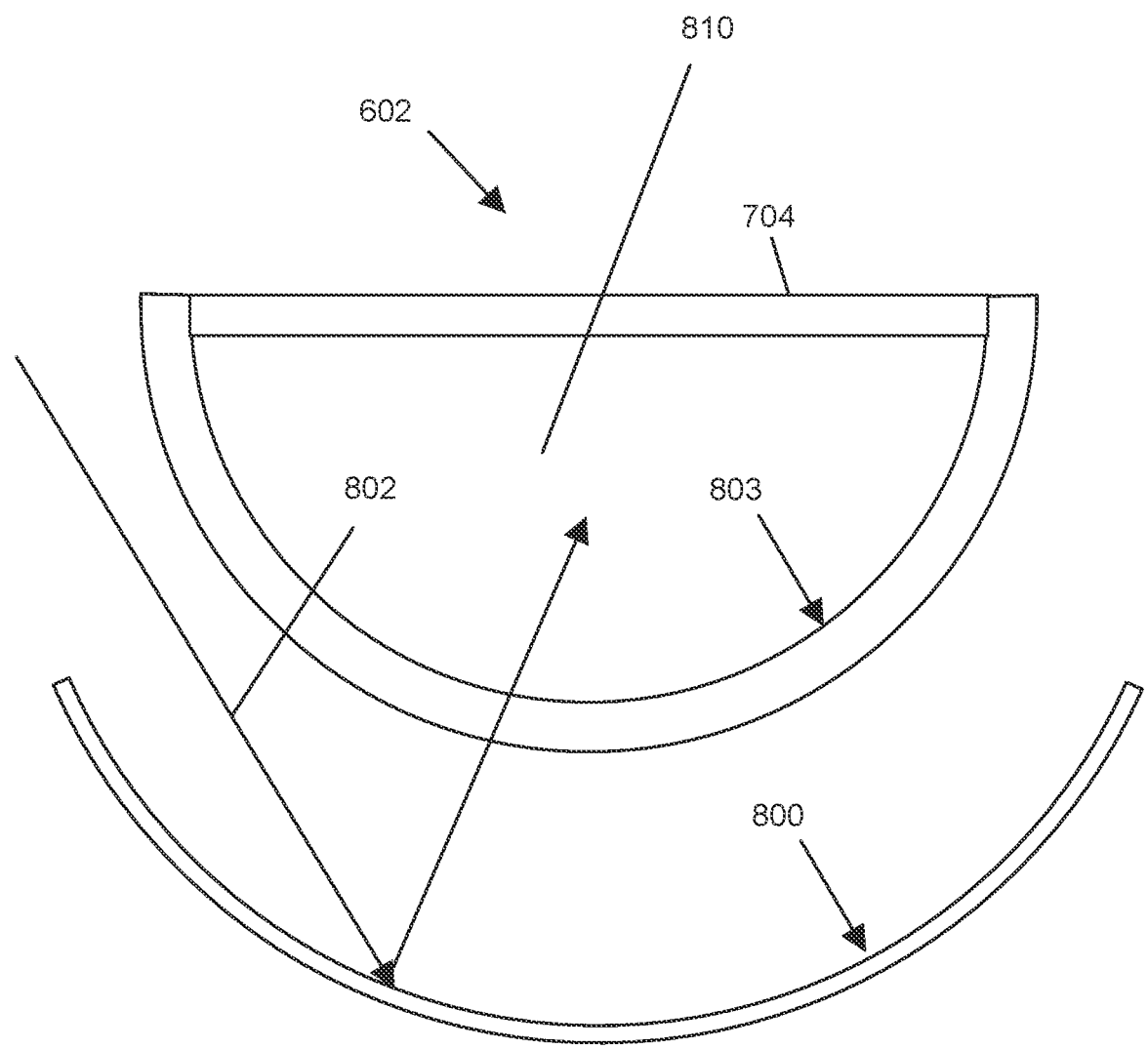
FIG. 8 shows a cross sectional end view of another embodiment of a transport line.

As shown in FIG. 8, in another embodiment, surface 803 of line 602 is optically transparent. A parabolic mirror 800 focuses light 802 on the hollow channel 810 and promotes pre-heating of water. The embodiment of FIG. 8 is otherwise substantially identical to the embodiment of FIG. 7.

Figure 9A:
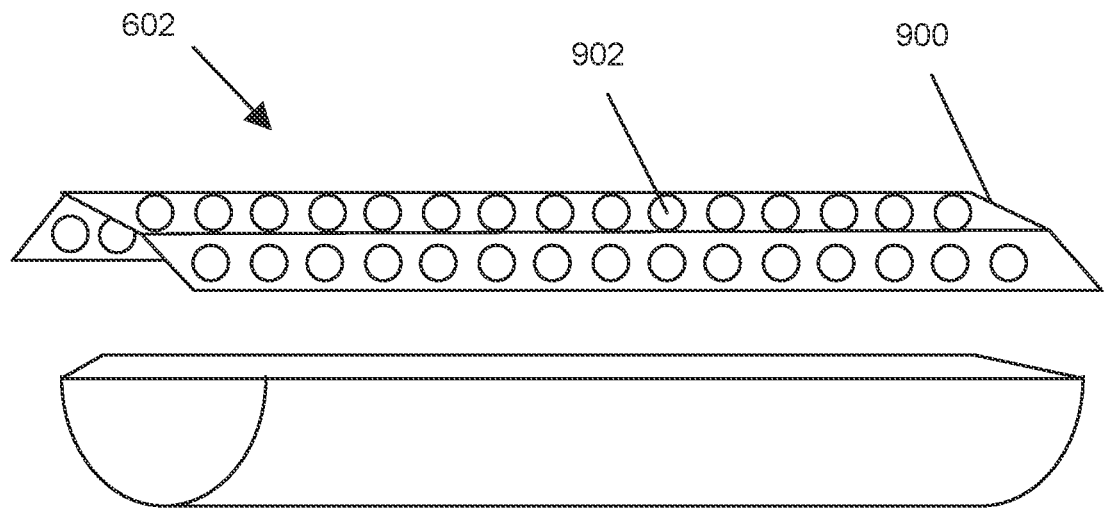
FIG. 9A and FIG. 9B shows perspective views of two other embodiments of a transport line.
Figure 9B:
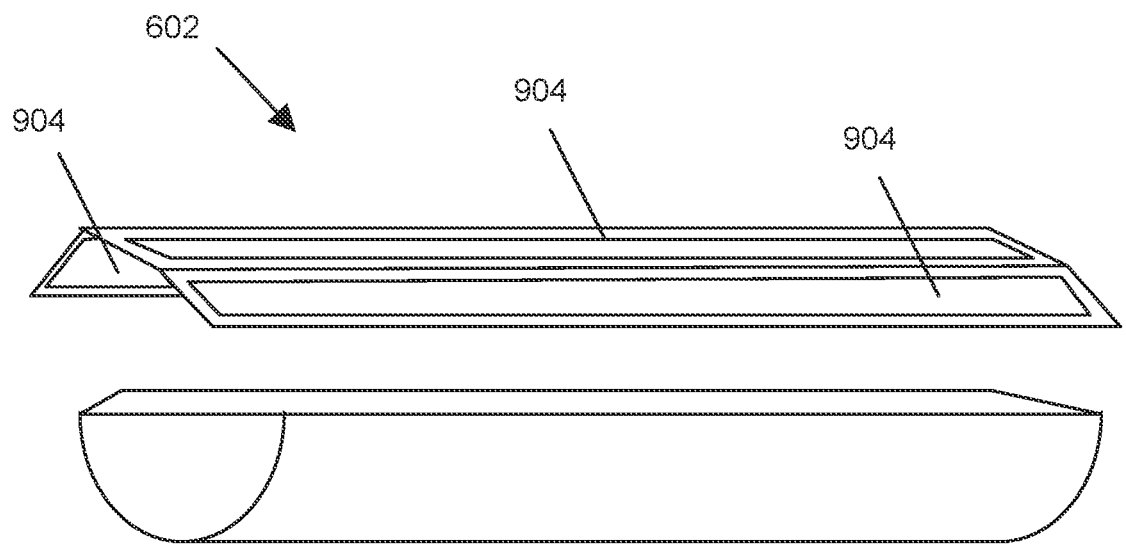

In FIG. 9A, positioned above the line 602 is an array of convex lenses to concentrate the solar energy. The focal point of the convex lens is formed near the nadir of the line 602. See, for example, FIG. 9A which depicts an array 900 of lenses 902. In one embodiment, the lenses are Fresnel lenses. The embodiment of FIG. 9B is similar except in that a linear convex lens 904 is used instead of the array of individual lenses 902. The lenses 902 or 904 may be used in conjunction with the opaque embodiment of FIG. 7 or with the transparent embodiment of FIG. 8.

Figure 10A:
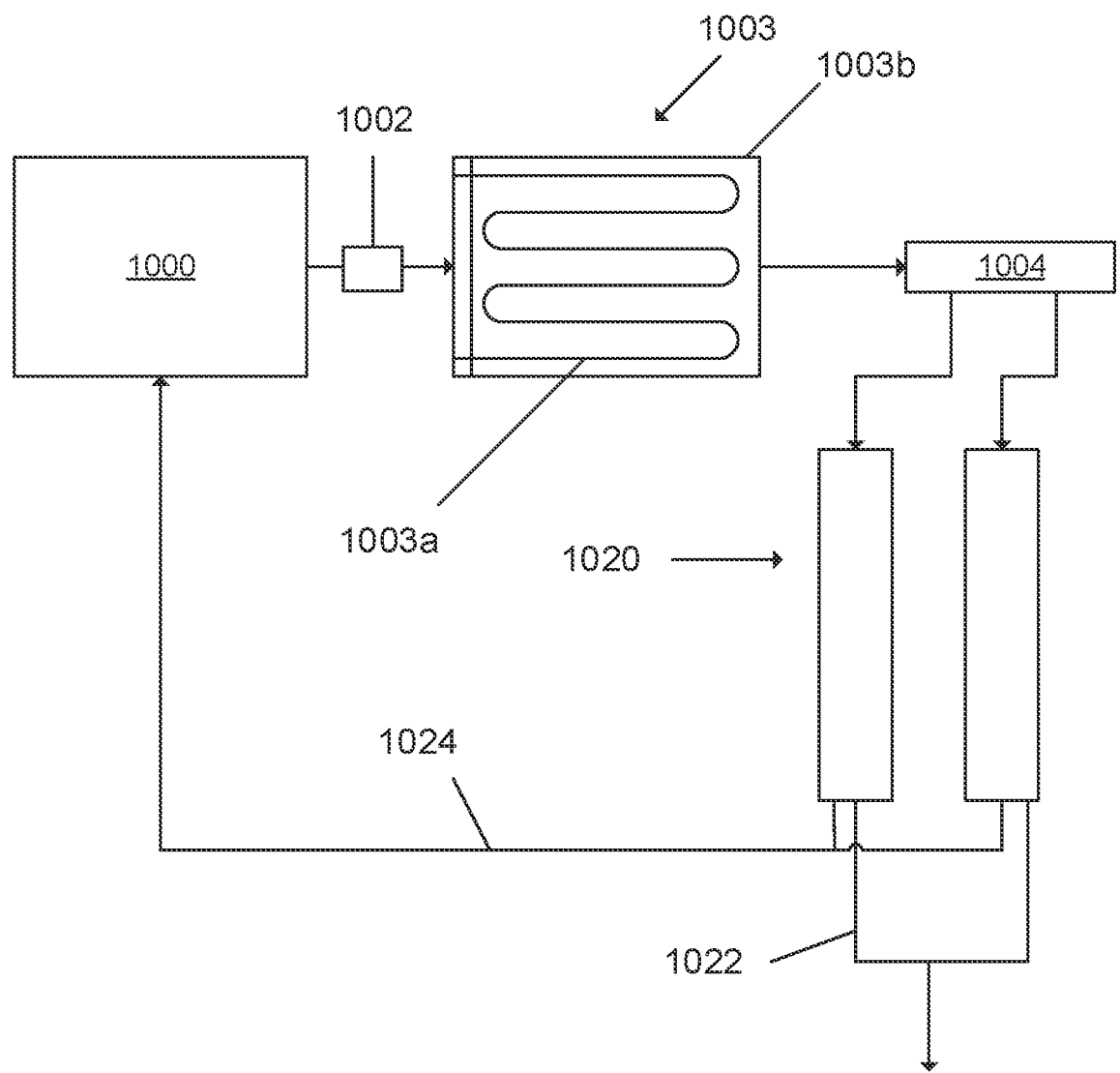
FIG. 10A is a schematic depiction of a system that uses a pre-heating system.
Figure 10B:
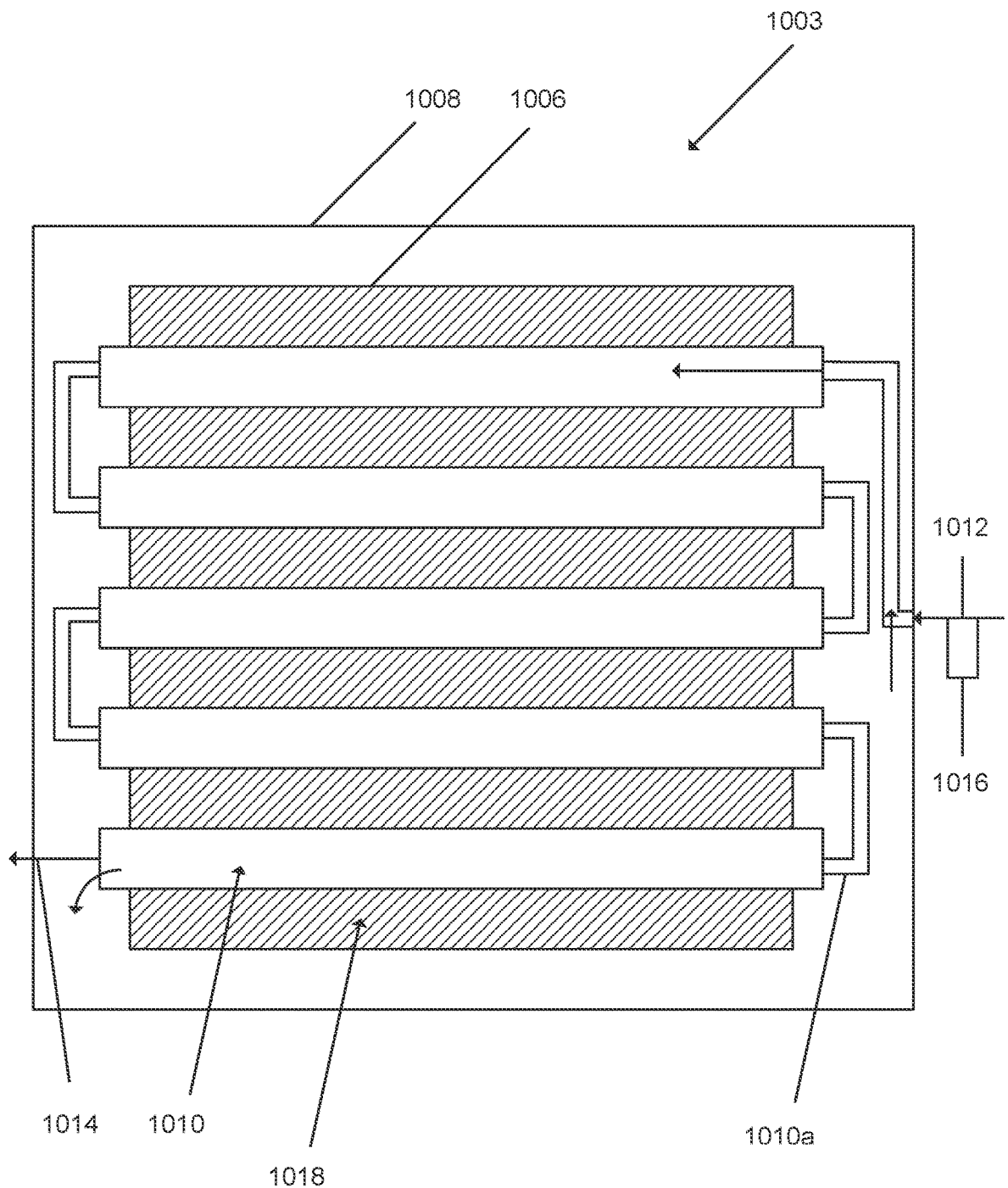
FIG. 10B is a schematic depiction of a pre-heating system that use a box-in-box configuration.
Figure 10C:
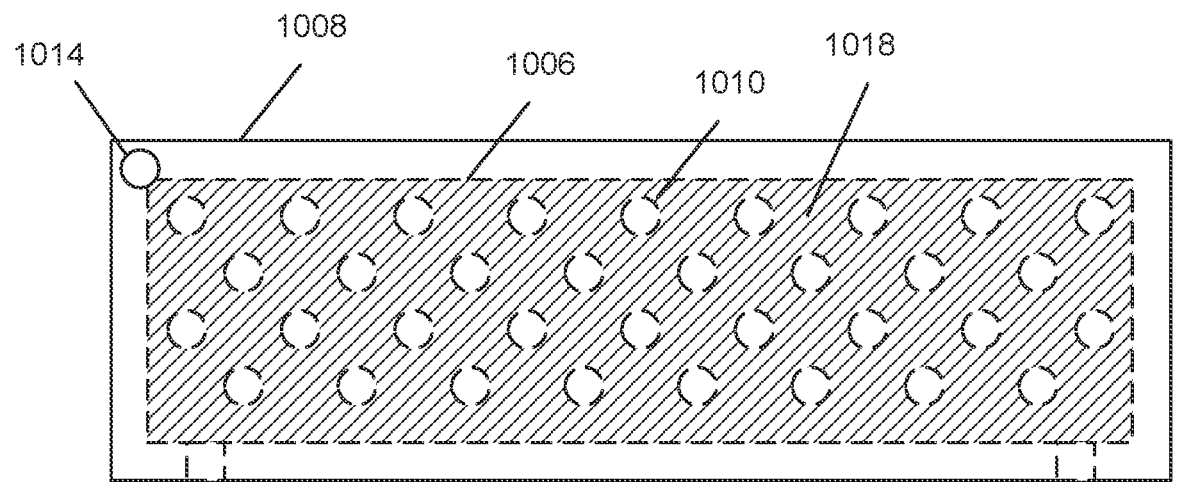
FIG. 10C is an end view of the pre-heating system and FIG. 10D is a perspective view of the pre-heating system.
Figure 10D:
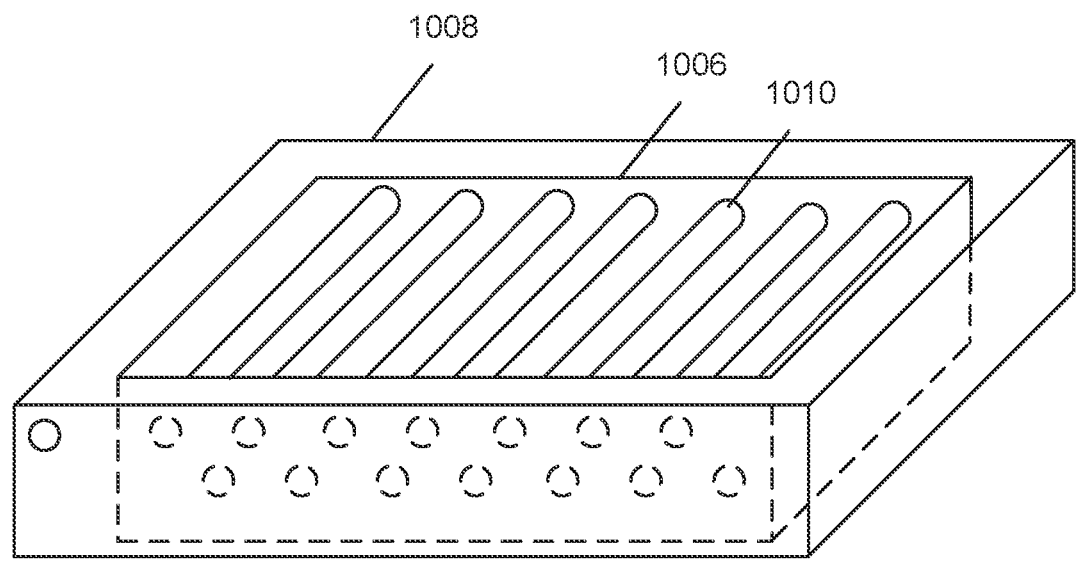

FIG. 10A depicts an embodiment wherein a day tank 1000 holds saltwater. A pump 1002 removes saltwater from the day tank 1000 and supplies the saltwater into a pre-heating system 1003. In one embodiment, the pre-heating system 1003 is a length of black pipe (e.g. a flexible hose) which contains the saltwater and sand to retain heat. The line 1003*a* may be coiled within an enclosure 1003*b* that has an optically transparent cover and bottom through which the concentrated solar energy will be transmitted. The enclosure 1003*b* may also have lenses and-or a linear parabolic mirror. The volume of water introduced into the pre-heater may be regulated by a rheostat based upon the water temperature within the pre-heating system 1003. FIG. 10A depicts a plurality of desalination units 1020 that provide potable water to a common output pipe 1022. Excess water can be returned to day tank 1000 using return line 1024, Referring to FIG. 10B, in one embodiment, the pre-heating system 1003 comprises an inner box 1006 inside of an outer box 1008. Both boxes are constructed of 20GA 316L stainless steel. Although only one pre-heating system 1003 is shown in FIG. 10A, multiple pre-heating systems can be connected in series or in parallel. Multiple flow tubes 1010 pass through the inner box 1006. The open ends of these flow tubes 1010 extended through opposite walls of the inner box 1006 such that the internal volume of the flow tubes is in fluid communication with the outer box. The inner box 1006 is open at the top. The outer box 1008 has an inlet port 1012 from the day tank and an outlet to return the contaminated water to the outer containment box. The purpose of this to continuously enhance the temperature of the water within the pre-heating system 1003. The outlet from the outer box 1008 feeds the saltwater to a desalination unit. In one embodiment, an electric pump 1016 circulates the water from the outer box and through the flow tubes 1010. In the embodiment of FIG. 10B, connecting flow tubes 1010*a* connect two flow tubes 1010 such that water is circulated through all the flow tubes 1010 by way of pump 2016, In another embodiment, water circulates through the flow tubes by diffusion. A baffle in front of inlet tube within the outer box deflects and directs the water into and through the tubes. The outer box also serves as a retention holding tank for the heated water. FIG. 10C is an end view of the pre-heating system 1003. FIG. 10D is a perspective view of the pre-heating system 1003.

The top of the pre-heating system 1003 of FIG. 10B is covered by an optically transparent cover. In one embodiment, the optically transparent cover has an array of Fresnel lenses above it that direct the concentrated solar energy through the optically transparent cover and into the interior of the inner box 1006. Concentrated solar energy may also be introduced from the bottom, and or sides, of the pre-heating system 1003. The inner box 1006 may be tilled with a thermal packing material 1018 such as black sand, pebbles, or other material that absorb and retains the heat while dispersing the heat to and around the flow tubes 1010. The flow tubes 1010 are not filled with the sand and provide a. high surface area for the water to contact the warm flow tubes. The sand retains heat for a prolonged period of time. For example, when the pre-heating system is approximately 61 cm×61 cm by 15 cm, the sand was found to retain significant heat overnight. The inner box 1006 is held aloft and in place by separation legs that are tack welded to the bottom of the inner box 1006. The inner box 1006 is set inside of the outer box 1008 at an offset, For example, the inner box 1006 may be placed 20 mm from the inlet port, 20 mm from the bottom and 45 mm from the outlet port 1014. In one embodiment, the outlet port 1014 includes a valve that automatically opens when the water in a desalination unit is low. Due to the presence of the open valve 1014 and the pump 1016, water is pumped out of the flow tubes 1010 and into the desalination unit(s), An additional embodiment of the pre-heater system is that it can be utilized as a separate unit for the purification of contaminated fresh water. Currently, in numerous areas fresh water is obtained from wells, catchment systems, rivers, lakes, and streams. While fresh, these waters are often contaminated with bacteria, disease, and harmful chemicals thereby requiring the administration of heat to reduce or eliminate the contamination, This is often done by boiling the water over an open wood-fueled fire. This not only adds air pollution to the atmosphere, but further contributes to climate degradation by the consumption of oxygen producing floral. The use of a solar powered water purification system eliminates the need for using a finite fuel source and replaces it with a sustainable energy source. The configuration of this system is identical to the pre-heater in most ways. The primary distinction is that instead of introducing the water into a desalination unit, the purified water is introduced into an external collector, ready for consumption.

A manifold 1004 routes water from the pre-heating system 1003 into a plurality of desalination units 1006, as described elsewhere in this specification. The desalination units 1006 have curved top surfaces as described in U.S. Pat. Nos. 10,150,049 and 10,150,050.

Figure 11:
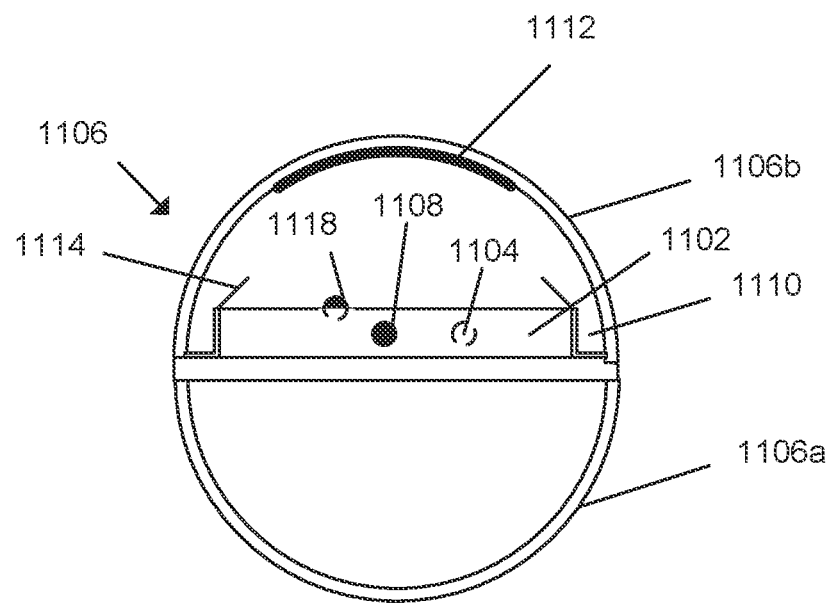
FIG. 11 and FIG. 12 are cross-section views of two desalination units.

A bisected view of one embodiment of the desalination units 1106 is shown in FIG. 11. The desalination units 1106 is generally cylindrical and comprises a bottom section 1106*a* and a top section 1106*b*. A water reservoir 1102 is provided that holds unpurified water. An input port 1104 provides water from the day tank to the water reservoir 1102. An overflow port 1118 removes excess water. An output port 1108 removes potable water from the side-gutters 1110. In the embodiment of FIG. 11A, an interior surface of the desalination units 1006 have a hydrophobic coating 1112 at the apex. Water therefore condenses on the sides of the desalination unit 1006 where it readily runs down for collection. Collection is facilitated by side-gutters 1110 which fluidly connect to the output port 1108. In one embodiment, side-gutters 1110 have flares 1114 such that they are angled inward to prevent spillage of contaminated water into the side-gutters 1110.

Figure 12:
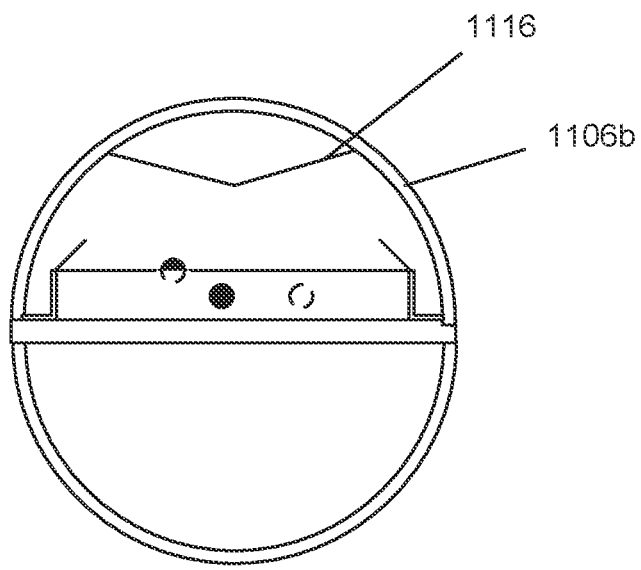

In the embodiment depicted in FIG. 12, the top section 1106*b* comprises a wedge 1116 on the interior that prevents condensation at the apex. This facilitates collection of water in the side-gutters 1110.

Figure 13:
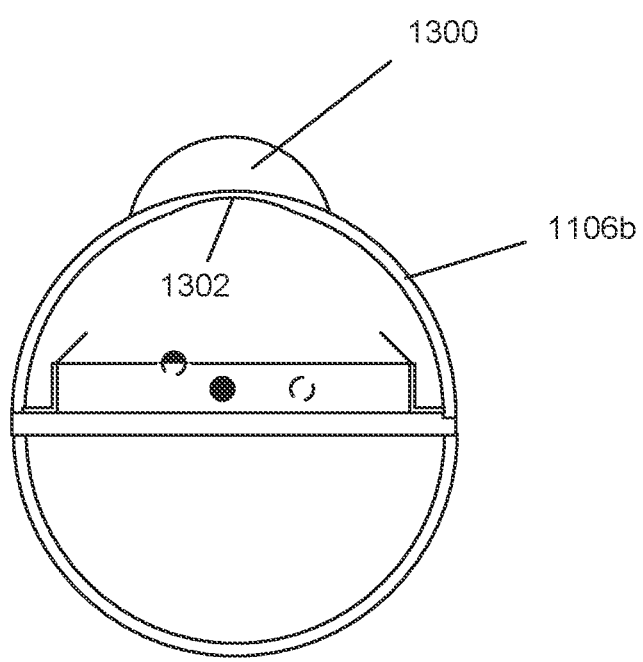
FIG. 13 is a cross-section view of another desalination unit.

In the embodiment of FIG. 13, a wind tunnel 1300 is at the top of each top section 1106*b*. The wind tunnel is a hollow structure that extends over the length of the top section 1106. A solar fan (not shown) sends cooling air through the wind tunnel 1300 to cool the surface of the top section 1106*b* and facilitate condensation. The thickness of the top section 1106*b* is reduced at thin section 1302 to help facilitate cooling at the apex.

Figure 14:
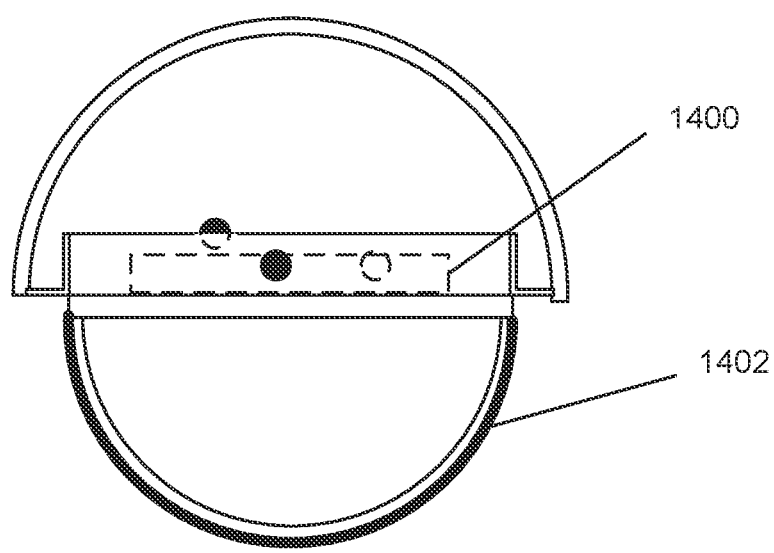
FIG. 14 is a cross-section view of another desalination unit.

Referring to FIG. 14, as described in U.S. Pat. No. 10,150,050, nanotechnology and sponges 1400 may also be present to facilitate evaporation. Also shown in FIG. 14 is a top section that is over sized relative to the bottom section such that the profile has a mushroom-cap shape. In any of the embodiments, a wedge can be used to prevent condensation of the water vapor at the apex of the top section. FIG. 14 also shows a heat retention coating 1402 on the bottom section that helps retain heat.

Figure 15A:
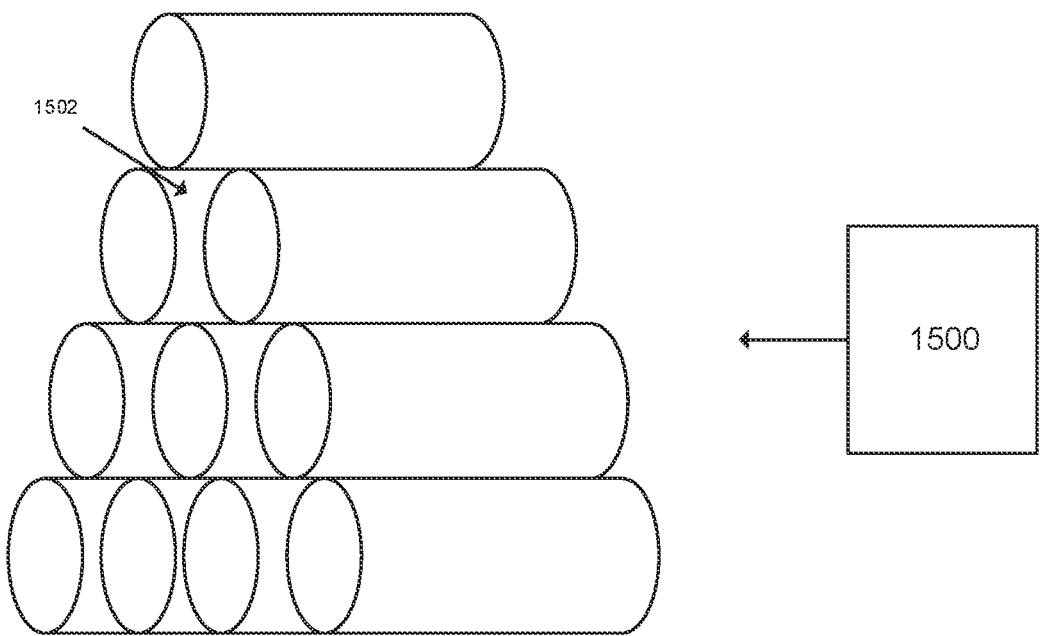
FIG. 15A and FIG. 15B depict stacked systems of multiple desalination units.
Figure 15B:
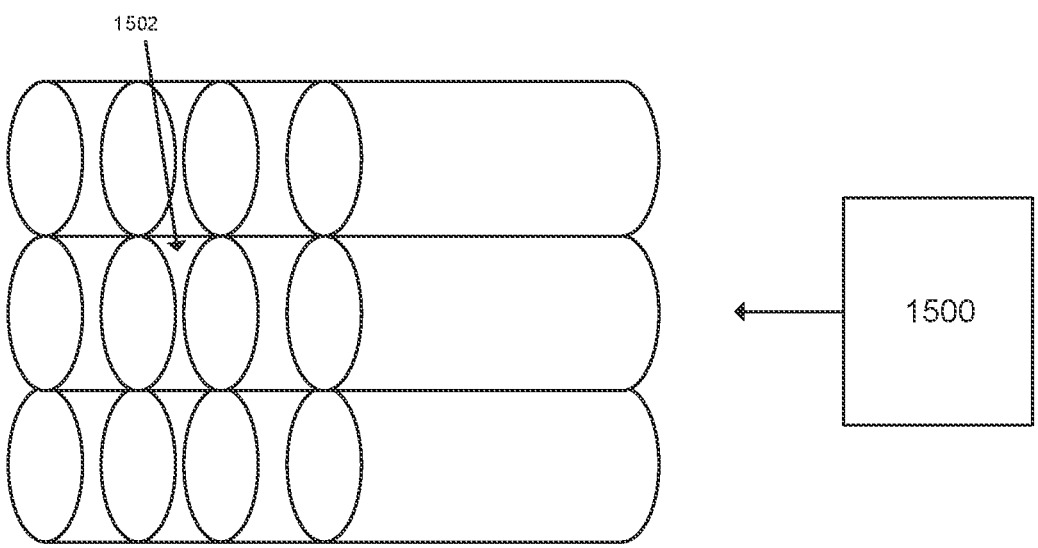

Referring to FIG. 15A and FIG. 15B, another embodiment of the desalination unit is depicted that allows for increased production through scale. This embodiment is particularly useful when used in conjunction with a pre-heating system such that the desalination units function primarily as condensers. Additionally, these embodiments facilitate cooling of the desalination units which further increases production. In this embodiment the desalination units are cylindrical and are stacked in either a pyramid (FIG. 15A) or cube (FIG. 15B) formation, This allows for defined spaces 1502 between the desalination units through which air is circulated by means of solar powered fans 1500. The pyramid or cube systems can be cooled by introducing fans to each side of the pyramid or cube. One advantage of the stacked systems is that the footprint of one square meter will remain the same, but the water production will be much greater. Also, this stacked system establishes spaces between the desalination units through which air can be circulated which cools the desalination units and increases production. The configuration of this embodiment may also include desalination units of differing sizes to increase the volume of water traversing the system. The volume of water and dwell time within the purification system is regulated in the same manner as in the pre-heater.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A water farm comprising:
   a water storage tower;
   at least one pump, powered by a green power source selected from the group consisting of a wind power source, a solar power source, a wave-powered source and a photovoltaic power source, that pumps water from a water reservoir to the water storage tower;
   a plurality of vertically stacked pipes for releasing water from the water storage tower and conveying the water to a day tank;
   a plurality of desalination units fluidly connected to the day tank, the plurality of desalination units providing desalinated water to a common output pipe, each desalination unit being a solar desalination unit comprising:
      a bottom section and a top section, each being horizontal cylindrical segments contacting one another along a respective flat edge to provide an elongated cylinder;
      the bottom section comprising a cover that defines the flat edge of the bottom section that is sealed to an optically transparent bottom surface to provide an evacuated area that has a pressure of less than one atmosphere;
      the top section comprises a liquid tray that defines the flat edge of the top section, at least one side-gutter that directs water that condenses on an interior surface of the top section to an output port, the liquid tray further comprising an input port for adding water into the liquid tray;
      wherein the top section comprises a hydrophobic coating proximate an apex of an internal surface of the top section, the hydrophobic coating facilitating collection of water in the at least one side-gutter; and
   a potable water storage tank fluidly connected to the common output pipe for receiving the desalinated water therefrom;
   wherein the plurality of desalination units are arranged in a vertical stack.

2. The water farm was recited in claim 1, wherein the water farm is located at an oil extraction facility that provides wastewater to the water reservoir.

3. The water farm was recited in claim 1, wherein the water farm is located at a natural gas extraction facility that provides wastewater to the water reservoir.

4. The water farm was recited in claim 1, wherein the water farm is located at a fracking facility that provides wastewater to the water reservoir.

5. The water farm as recited in claim 1, further comprising a plurality of heating systems, wherein each heating system is disposed directly upstream of a corresponding one of the desalination units, the heating systems comprising:
   an outer box with an optically transparent cover;
   an inner box disposed within the outer box, the inner box comprising
      a plurality of flow tubes that extend through two walls of the inner box, each flow tube having an internal volume that is in fluid communication with the outer box;
   a thermal packing material disposed in spaces between each flow tube.

6. The water farm as recited in claim 1, further comprising at least one diesel pump that is a backup pump for the at least one pump that is powered by the green power source.

7. The water farm as recited in claim 1, wherein the stack is a stacked cube or a stacked pyramid.

8. The water farm as recited in claim 1, wherein the at least one side-gutter comprises a flare that is angled inward to prevent spillage of contaminated water into the at least one side-gutter.

9. A water farm comprising:
   a water storage tower;
   at least one pump, powered by a green power source selected from the group consisting of a wind power source, a solar power source, a wave-powered source and a photovoltaic power source, that pumps water from a water reservoir to the water storage tower;
   a plurality of vertically stacked pipes for releasing water from the water storage tower and conveying the water to a day tank;
   a plurality of desalination units fluidly connected to the day tank, the plurality of desalination units providing desalinated water to a common output pipe, each desalination unit being a solar desalination unit comprising:
      a bottom section and a top section, each being horizontal cylindrical segments contacting one another along a respective flat edge to provide an elongated cylinder;
      the bottom section comprising a cover that defines the flat edge of the bottom section that is sealed to an optically transparent bottom surface to provide an evacuated area that has a pressure of less than one atmosphere;

the top section comprises a liquid tray that defines the flat edge of the top section, at least one side-gutter that directs water that condenses on an interior surface of the top section to an output port, the liquid tray further comprising an input port for adding water into the liquid tray;

wherein the top section comprises a wedge proximate an apex of an internal surface of the top section, the wedge facilitating collection of water in the at least one side-gutter; and a potable water storage tank fluidly connected to the common output pipe for receiving the desalinated water therefrom;

wherein the plurality of desalination units are arranged in a vertical stack.

10. A water farm comprising:

a water storage tower;

at least one pump, powered by a green power source selected from the group consisting of a wind power source, a solar power source, a wave-powered source and a photovoltaic power source, that pumps water from a water reservoir to the water storage tower;

a plurality of vertically stacked pipes for releasing water from the water storage tower and conveying the water to a day tank;

a plurality of desalination units fluidly connected to the day tank, the plurality of desalination units providing desalinated water to a common output pipe, each desalination unit being a solar desalination unit comprising:

a bottom section and a top section, each being horizontal cylindrical segments contacting one another along a respective flat edge to provide an elongated cylinder;

the bottom section comprising a cover that defines the flat edge of the bottom section that is sealed to an optically transparent bottom surface to provide an evacuated area that has a pressure of less than one atmosphere;

the top section comprises a liquid tray that defines the flat edge of the top section, at least one side-gutter that directs water that condenses on an interior surface of the top section to an output port, the liquid tray further comprising an input port for adding water into the liquid tray;

wherein the top section comprises a wind tunnel proximate an apex of an external surface of the top section, the wind tunnel facilitating collection of water in the at least one side-gutter; and a potable water storage tank fluidly connected to the common output pipe for receiving the desalinated water therefrom;

wherein the plurality of desalination units are arranged in a vertical stack.

11. A method for using a water farm wherein the water farm has a structure as recited in claim 1, the method comprising:

pumping the water from the water reservoir to the water storage tower;

releasing water from the water storage tower, through at least one of the vertically stacked pipes, and conveying the water into the day tank;

introducing water from the day tank into an outer box of a heating system, the heating system comprising:

an outer box with an optically transparent cover;

an inner box disposed within the outer box, the inner box comprising a plurality of flow tubes that extend through two walls of the inner box, each flow tube having an internal volume that is in fluid communication with the outer box;

a thermal packing material disposed in spaces between each flow tube;

circulating water from the outer box, through the flow tubes;

heating the inner box by permitting sunlight to pass through the optically transparent cover of the outer box such that the inner box, including the thermal packing material and the plurality of flow tubes, is heated;

removing heated water from the outer box through an outlet port and conveying the heated water to the desalination units, thereby producing potable water;

conveying the potable water to the potable water storage tank.

12. The method as recited in claim 11, further comprising releasing water from the potable water storage tank to a farm area.

\* \* \* \* \*